(12) United States Patent
Yamagishi (10) Patent No.: US 8,647,786 B2
(45) Date of Patent: Feb. 11, 2014

(54) FUEL CELL SYSTEM

(75) Inventor: Norio Yamagishi, Miyoshi (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 427 days.

(21) Appl. No.: 12/810,687

(22) PCT Filed: Dec. 9, 2008

(86) PCT No.: PCT/JP2008/072347
§ 371 (c)(1),
(2), (4) Date: Jun. 25, 2010

(87) PCT Pub. No.: WO2009/081726
PCT Pub. Date: Jul. 2, 2009

(65) Prior Publication Data
US 2010/0285380 A1    Nov. 11, 2010

(30) Foreign Application Priority Data
Dec. 26, 2007 (JP) ................................ 2007-333440

(51) Int. Cl.
*H01M 8/04* (2006.01)
(52) U.S. Cl.
USPC ........................................ 429/437; 429/434
(58) Field of Classification Search
USPC ................................. 429/434, 437
See application file for complete search history.

(56) References Cited

U.S. PATENT DOCUMENTS

| | | | |
|---|---|---|---|
| 2002/0164512 A1* | 11/2002 | Grasso | 429/26 |
| 2007/0122669 A1* | 5/2007 | Kusano et al. | 429/26 |
| 2009/0101423 A1* | 4/2009 | Jufuku | 180/65.31 |
| 2010/0086810 A1* | 4/2010 | Hood et al. | 429/13 |

FOREIGN PATENT DOCUMENTS

| | | |
|---|---|---|
| DE | 100 49 801 A1 | 4/2001 |
| DE | 10 2006 046 106 A1 | 4/2007 |
| JP | 2003-123805 A | 4/2003 |
| JP | 2004-146303 A | 5/2004 |
| JP | 2005-158339 * | 6/2005 |
| JP | 2005-158339 A | 6/2005 |
| JP | 2006-100053 A | 4/2006 |
| JP | 2007-103082 A | 4/2007 |
| WO | WO 2005/034272 A1 | 4/2005 |

OTHER PUBLICATIONS

Office Action issued Mar. 19, 2012 in DE 11 2008 003 551.2-45 and English translation thereof.

* cited by examiner

*Primary Examiner* — Ula C Ruddock
*Assistant Examiner* — Frank Chernow
(74) *Attorney, Agent, or Firm* — Kenyon & Kenyon LLP (57) ABSTRACT

A cell stack pair (100a, 100b) includes refrigerant introduction openings (42a, 42b) arranged at lower end portions of the cell stacks (100a, 100b) and also includes refrigerant discharge openings (44a, 44b) arranged at upper end portions of the cell stacks (100a, 100b), and the cell stack pair (100a, 100b) is arranged symmetrical about a plane (v) vertical to a horizontal plane (h). The direction of stacking of unit cells (50) in each of the cell stacks (100a, 100b) is inclined relative to the horizontal plane (h).

7 Claims, 4 Drawing Sheets

FUEL CELL SYSTEM

This is a 371 national phase application of PCT/JP2008/072347 filed 9 Dec. 2008, claiming priority to Japanese Patent Application No. JP 2007-333440 filed 26 Dec. 2007, the contents of which are incorporated herein by reference.

TECHNICAL FIELD

The present invention relates to a fuel cell system, and more particularly to a fuel cell system having a plurality of cell stacks, each formed by stacking a plurality of unit cells, each having a fuel electrode and an oxidizing electrode.

BACKGROUND ART

Figure 3:
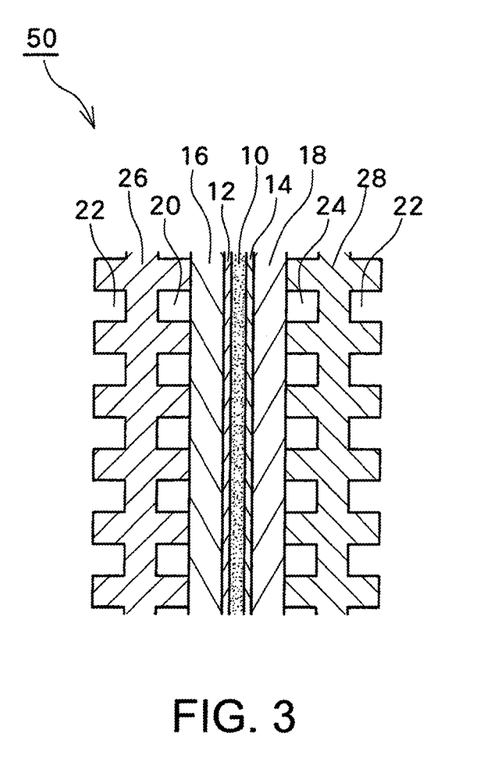
FIG. 3 is a schematic diagram of a configuration of a main part of a unit cell.

A configuration of a general fuel cell unit cell (also referred to as a unit cell) and, particularly, a configuration of a main part of the fuel cell unit cell including electrode sections, will be outlined below. As shown in FIG. 3, the so-called membrane electrode assembly (MEA) is configured by providing a cathode catalyst layer 12 (also referred to as an oxidizing electrode or a cathode electrode) and an anode catalyst layer 14 (also referred to as a fuel electrode or an anode electrode) so as to face each other with an electrolyte membrane 10 thereinbetween, and further by providing a cathode diffusion layer 16 and an anode diffusion layer 18 outside the cathode catalyst layer 12 and the anode catalyst layer 14, respectively. Further, a unit cell 50 is formed by, for example, adhesively bonding a cathode side separator 26 which is provided outside the cathode diffusion layer 16 and in which an oxidizing gas flow path 20 and a cell refrigerant flow path 22 are formed, and an anode side separator 28 which is provided outside the anode diffusion layer and in which a fuel gas flow path 24 and a cell refrigerant flow path 22 are formed, in an integrated manner.

In the unit cell 50 shown in FIG. 3, electricity is generated by supplying, as reactant gases, an oxidizing gas containing at least oxygen, such as oxygen or air, to the cathode catalyst layer 12, and a fuel gas containing at least hydrogen, such as hydrogen or a reformed gas, to the anode catalyst layer 14. Because, in such a fuel cell, heat is normally generated in a chemical reaction during electricity generation, the fuel cell is prevented from being overheated by causing a refrigerant such as water or ethylene glycol to flow through the cell refrigerant flow paths 22 shown in FIG. 3, thereby controlling the fuel cell to be within a predetermined temperature range, such as approximately 60 degrees to 100 degrees.

Figure 4:
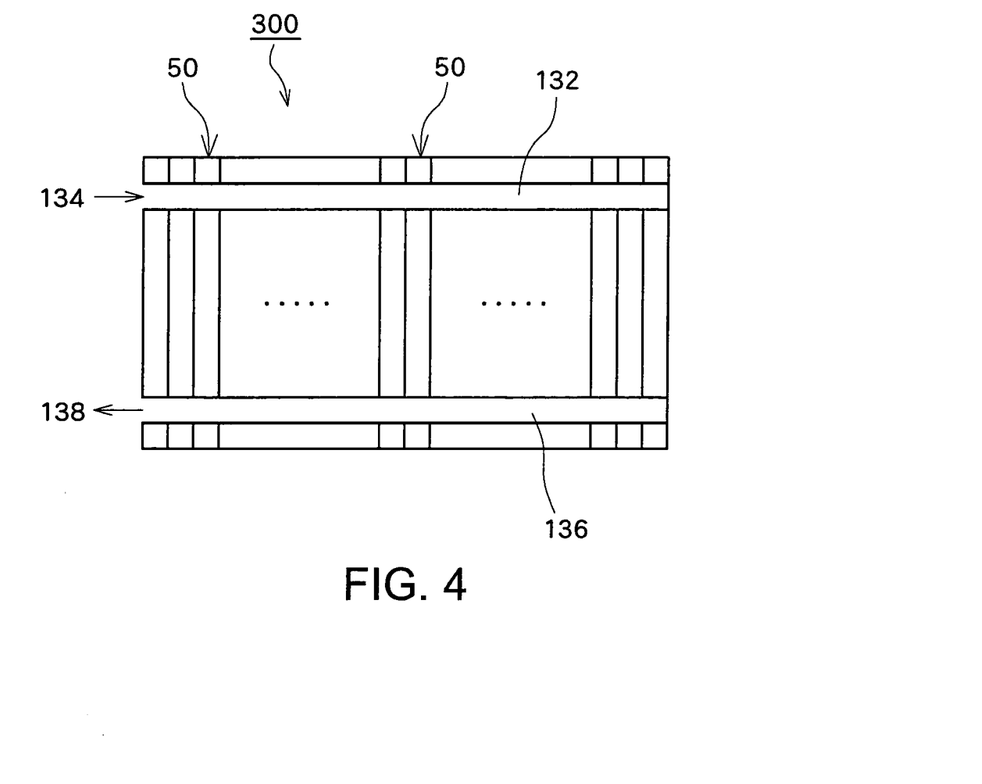
FIG. 4 is an example schematic diagram of a configuration of a fuel cell stack.

FIG. 4 shows an example schematic configuration of a general cell stack formed by stacking a plurality of unit cells 50 shown in FIG. 3. Because FIG. 4 is used for an explanation of the flow of a fluid (containing a reactant gas (an oxidizing gas or a fuel gas) and a refrigerant) which is supplied from the outside to the inside of the cell stack and discharged therefrom, the detailed configuration of the unit cell 50 including, for example, the separators and the MEA is omitted or described only briefly.

In FIG. 4, a cell stack 300 is usually a stack of a plurality of unit cells 50 which are necessary to obtain a desired electricity generation performance. The cell stack 300 (also referred to as a fuel cell stack) is configured such that the entire stack of the unit cells 50 is pressed and held from the outside of the both ends of the unit cell 50 stack along the stacking direction, and is fixed in place by, for example, fastening bolts (not illustrated).

Further, in FIG. 4, a fluid supply manifold 132 and a fluid discharge manifold 136 are formed so as to penetrate through each of the unit cells 50. After a fluid is supplied from outside, for example, as indicated by an arrow 134, the fluid flows through inside a fluid flow path (not illustrated herein), thereby being used for cell reaction or heat exchange in electrode sections (not illustrated) of the unit cell stacks 50 and then discharged to the outside, as indicated by an arrow 138.

In FIG. 4, the fluid supply manifold 132 is at least one of three independent supply manifolds for different types of fluids; that is, one of a fuel gas supply manifold, an oxidizing gas supply manifold, and a refrigerant supply manifold. Similarly, the fluid discharge manifold 136 is one of three independent discharge manifolds which correspond to the fluid supply manifold 132; that is, one of a fuel gas discharge manifold, an oxidizing gas discharge manifold, and a refrigerant discharge manifold.

Specifically, in the cell stack or the fuel cell stack 300 shown in FIG. 4, the fuel gas supplied from the fuel gas supply manifold (132) is distributed to fuel gas flow paths (not illustrated) formed in the unit cells 50 (corresponding to the fuel gas flow path 24 formed in the unit cell 50 shown in FIG. 3) and used for cell reaction in the unit cells 50, and then discharged, as off-gas, from the fuel gas discharge manifold (136). Meanwhile, the oxidizing gas supplied from the oxidizing gas supply manifold (132) is distributed to oxidizing gas flow paths (not illustrated) formed in the unit cells 50 (corresponding to the oxidizing gas flow path 20 formed in the unit cell 50 shown in FIG. 3) and used for cell reaction in the unit cells 50, and then discharged, as off-gas, from the oxidizing gas discharge manifold (136). Further, the refrigerant supplied from the refrigerant supply manifold (132) is distributed to refrigerant flow paths (not illustrated) formed in the unit cells 50 (corresponding to the cell refrigerant flow paths 22 formed in the unit cell 50 shown in FIG. 3) and used for heat exchange with the unit cells 50, and then discharged from the refrigerant discharge manifold (136).

In order that the electrolyte membrane 10 performs a predetermined function as a fuel cell in the unit cell 30 shown in FIG. 3, the electrolyte membrane 10 must function as a proton conductive electrolyte membrane, and, for this purpose, it needs to maintain at least an amount of moisture greater than a predetermined amount of moisture. It is therefore a common practice to maintain a certain amount of moisture in the electrolyte membrane 10 by, for example, supplying into the unit cell 50 a fuel gas and/or an oxidizing gas that are humidified in advance to contain a predetermined amount of moisture (these are sometimes generically referred to as reactant gases).

Meanwhile, the temperature of the fuel cell stack normally drops to around room temperature during downtime. Therefore, when the humidified reactant gases are caused to flow during the operating period as described above, the moisture in the reactant gases remaining in each of the reactant gas supply and discharge manifolds may be condensed. If the amount of condensed moisture is large and water cannot be discharged, the so-called flooding in which the manifolds and the fluid flow paths are blocked with the moisture may occur. Further, particularly during the cold period, such condensed water may be frozen in the flow paths, and restarting operation may take time.

Figure 5:
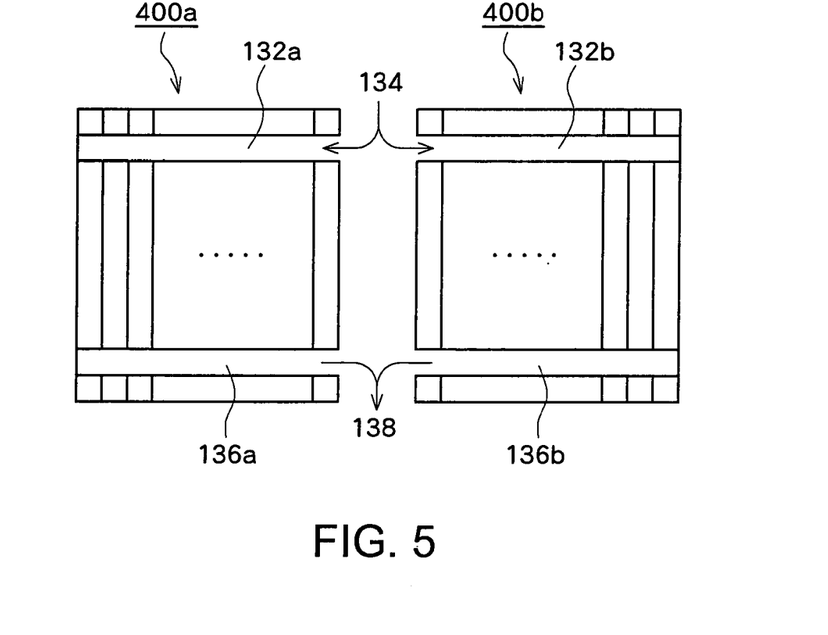
FIG. 5 is a schematic diagram of a configuration of a fuel cell having a pair of cell stacks.

In response to this, as shown in FIG. 5, a combined pair of cell stacks of a first cell stack 400a and a second cell stack 400b; that is, a configuration in which the number of laminations of the unit cells are divided into two parts, can be used. According to the present embodiment, it is possible to acquire the necessary electromotive force in the entire pair of cell stacks, while reducing the amount of accumulated condensed water by shortening the discharge distance for the condensed water; more specifically, the length of the reactant gas supply/discharge manifolds.

However, simply reducing the number of laminates of the unit cells may still be insufficient, because discharge of the condensed water containing produced water depends on a flow volume, a flow rate, and a temperature of off-gas flowing through each of the reactant gas manifolds.

Patent Document 1 discloses stacks that are positioned in a V-shape when viewed from the unit cell stacking direction, in order to discharge hydrogen remaining in a stack case.

Patent Document 2 discloses a fuel cell stack which is inclined at a predetermined angle in order to create balance in design, and which has a short tube for effectively extracting the air entrained in a cooling water flow path.

Patent Literature 1: JP 2005-158339 A
Patent Literature 2: JP 2007-103082 A

DISCLOSURE OF THE INVENTION

Technical Problem

The present invention provides a fuel cell stack that can discharge moisture in a reactant gas flow path, and more specifically, moisture in a reactant gas manifold to the outside easily and quickly, and that can improve the cooling efficiency of unit cells using a refrigerant.

Solution to the Problem

A configuration of the present invention is as follows.

(1) A fuel cell system having a cell stack formed by stacking a plurality of unit cells, each having a fuel electrode and an oxidizing electrode, a refrigerant inlet provided in a lower end side portion of the cell stack, for introducing a refrigerant to be used for heat exchange with the unit cells into the inside of the cell stack, and a refrigerant outlet provided in an upper end portion of the cell stack, for discharging the refrigerant used for heat exchange with the unit cells to the outside of the cell stack, and, in this fuel cell system, a pair of cell stacks which are positioned symmetrically to each other with respect to a plane perpendicular to a horizontal plane are positioned such that unit cell stacking directions of the cell stacks are inclined with respect to the horizontal plane.

(2) A fuel cell system as described above, in which the pair of cell stacks are positioned in a V shape or a Λ shape when viewed from the side along the unit cell stacking direction.

(3) A fuel cell system as described above, in which at least one of a fluid flow pipe and an electrical wire is provided near the cell stack.

(4) A fuel cell system as described above, in which a degasification unit for removing the air from the refrigerant discharged to the outside of the cell stack is provided near the refrigerant outlet.

Advantageous Effects of the Invention

Moisture in a reactant gas manifold can be discharged to the outside easily and quickly and the cooling efficiency of a unit cell using a refrigerant can be improved.

REFERENCE SIGNS LIST

10 electrolyte membrane, 12 cathode catalyst layer, 14 anode catalyst layer, 16 cathode diffusion layer, 18 anode diffusion layer, 20 oxidizing gas flow path, 22 cell refrigerant flow path, 24 fuel gas flow path, 26 cathode side separator, 28 anode side separator, 32a and 32b reactant gas supply manifold, 32c and 32d refrigerant supply manifold, 36a and 36b reactant gas discharge manifold, 36c and 36d refrigerant discharge manifold, 42a and 42b refrigerant inlet, 44a and 44b refrigerant outlet, 46 branch section, 48a, 48b, and 48c degasification unit, 50 unit cell, 56 merging section, 100a, 100b, 200a, 200b, 300, 400a, and 400b cell stack (fuel cell stack), 100 and 200 fuel cell system, 132, 132a, and 132b fluid supply manifold, 136, 136a, and 136b fluid discharge manifold.

BEST MODE FOR CARRYING OUT THE INVENTION

Embodiments of the present invention will now be described in detail below with reference to the drawings. The same numerals are assigned to identical components in the drawings, and redundant descriptions will be omitted.

Figure 1A:
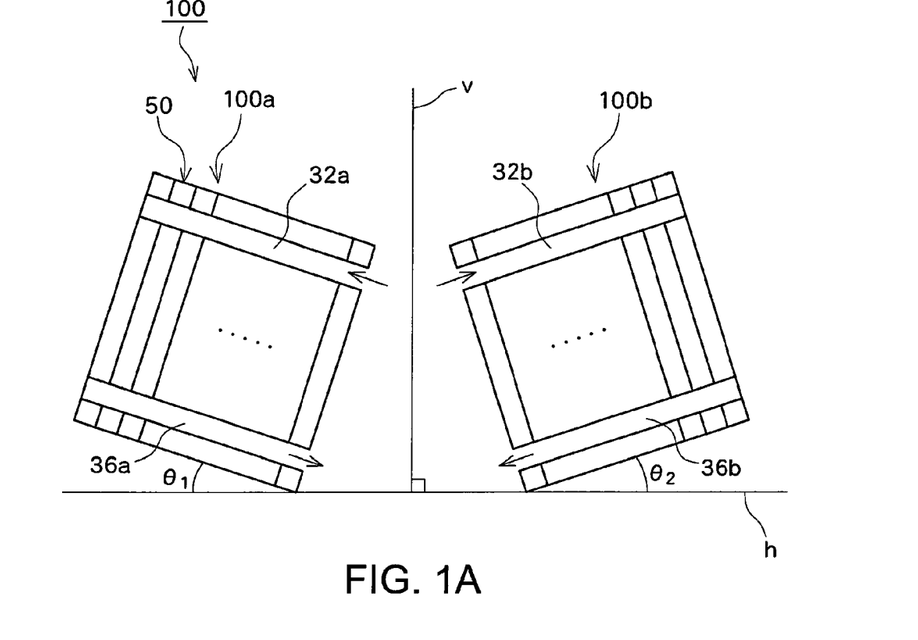
FIG. 1A is a schematic diagram of a fuel cell system configuration according to an embodiment of the present invention.
Figure 1B:
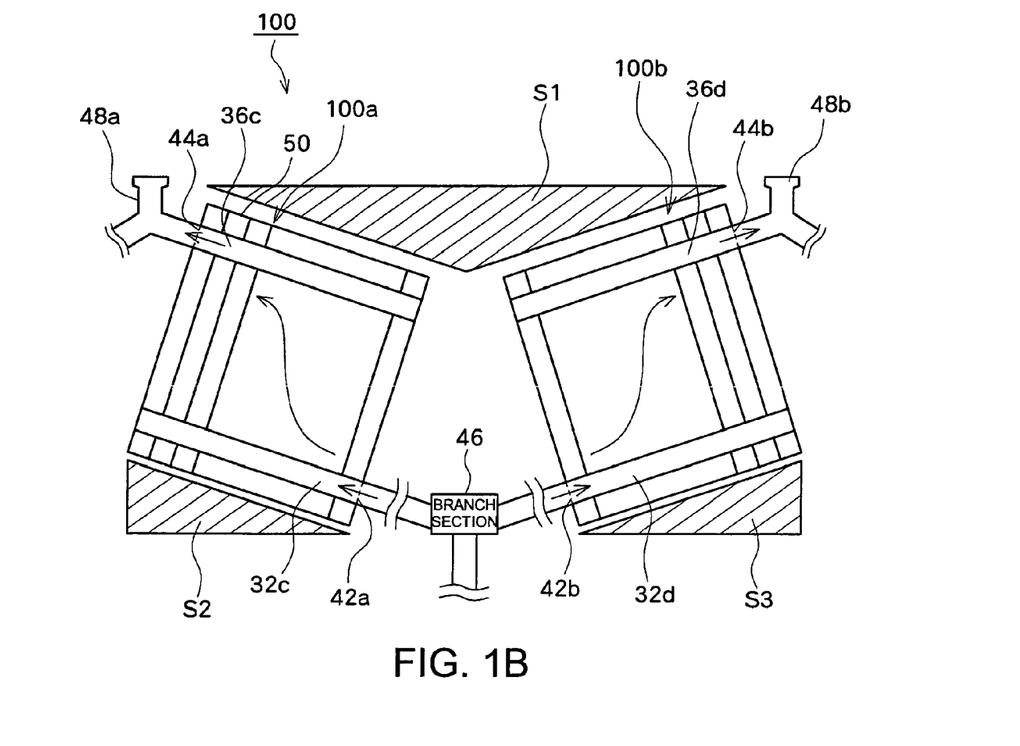
FIG. 1B is another schematic diagram of a fuel cell system configuration according to an embodiment of the present invention.

FIG. 1A and FIG. 1B are schematic diagrams of an example configuration of a fuel cell system according to an embodiment of the present invention; FIG. 1A is a diagram particularly focusing on the flow of reactant gases.

In a fuel cell system 100 of FIG. 1A, a first cell stack 100a and a second cell stack 100b constitute a pair of cell stacks and are positioned symmetrically to each other with respect to a plane v perpendicular to a horizontal plane h, at an inclination in a general V shape when viewed from the side along the stacking direction of the unit cells 50.

In FIG. 1A, the first cell stack 100a and the second cell stack 100b constituting the pair of cell stacks can be replaced with components having the same configurations as a first cell stack 400a and a second cell stack 400b shown in FIG. 5, respectively. In the first cell stack 100a and the second cell stack 100b, the reactant gases supplied into the cell stacks from reactant gas supply manifolds 32a and 32b are used for electrode reaction in unit cells 50, and then discharged, as off-gas, to the outside of the cell stacks from reactant gas discharge manifolds 36a and 36b, respectively. Here, by positioning the first cell stack 100a and the second cell stack 100b so as to be inclined forward at $\theta_1$ and $\theta_2$ with respect to the horizontal plane h, respectively (that is, by moving the upper end portions of the facing pair of the cell stacks closer to each other as compared to the lower end portions), the reactant gas supply manifolds 32a and 32b and the reactant gas discharge manifolds 36a and 36b penetrating through each of the unit cells 50 are also inclined with respect to the horizontal plane h at approximately $\theta_1$ and $\theta_2$. Further, by setting $\theta_1=\theta_2$ and positioning the pair of cell stacks symmetrically with respect to the plane v perpendicular to the horizontal plane h, it is possible to preferably control operation of each of the cell stacks in almost the same manner.

According to the present embodiment, provision of the inclined reactant gas manifolds is preferable, because they enable the moisture, which may be condensed in the reactant gas manifolds, to be discharged to the outside by its own weight, for example, even under low load operation where the flow volume and the flow rate of the reactant gas are insufficient, under high humidity operation where the amount of moisture to be discharged increases, and during downtime of the cell stacks where the flow of the reactant gas stops.

In the present embodiment, the directions of the flow routes of the reactant gases are not limited to the directions shown in FIG. 1A, and other configurations that prevent accumulation of the condensed water inside the manifolds can be adopted. From the viewpoints of efficiency and miniaturization, it is preferable to adopt a configuration in which the reactant gas flow paths, which communicate with the respective reactant gas manifolds to supply the reactant gases or discharge the off-gas, are at least partially merged and shared.

FIG. 1B is a diagram particularly focusing on the flow of the refrigerant in the fuel cell system shown in FIG. 1A. The fuel cell stack 100 shown in FIG. 1B has refrigerant supply manifolds 32c and 32d having refrigerant inlets 42a and 42b in the lower end side portions of the cell stacks, respectively, and refrigerant discharge manifolds 36c and 36d having refrigerant outlets 44a and 44b in the upper end side portions of the cell stacks, respectively. The refrigerant is caused to flow therein. In the present embodiment, the lower end side portions of the cell stacks are portions of the refrigerant flow paths formed in the cell stacks, which are located on the lower end side with respect to the horizontal plane. The lower end side portions described herein are one end portions of the refrigerant supply manifolds 32c and 32d shown in FIG. 1B. Further, the upper end side portions of the cell stacks are portions of the refrigerant flow paths formed in the cell stacks, which are located on the upper end side with respect to the horizontal plane. The upper end side portions described herein are one end portions of the refrigerant discharge manifolds 36c and 36d shown in FIG. 1B.

In the present embodiment, the refrigerant divided at a branch section 46 is used for heat exchange with the unit cells 50 constituting the first cell stack 100a and the second cell stack 100b, and then discharged from the refrigerant discharge manifolds 36c and 36d, respectively. According to the present embodiment, the refrigerant supplied from the lower end side portions of the cell stacks flows toward the upper end side of the cell stacks while filling the refrigerant flow paths, thereby improving the cooling efficiency of the unit cells 50.

Further, in FIG. 1B, when a refrigerant flow circulation system is adopted, it is possible to adopt a configuration in which the used refrigerant discharged to the outside of the cell stacks from the refrigerant outlets 44a and 44b is merged in a merging section (not illustrated) and then recycled by, for example, heat exchange or impurity removal, to thereby be reused as the refrigerant. Here, it is preferable to remove gas entrained in the refrigerant, such as the air in the environment, by providing degasification units 48a and 48b in the refrigerant flow path, preferably, in portions near the refrigerant outlets 44a and 44b where the flows of the refrigerant shift to the declining side. According to the present embodiment, the degasification units are preferable, because they maintain the cooling efficiency of the circulated refrigerant and prevent deterioration of the refrigerant if, for example, ethylene glycol is adopted as the refrigerant. Preferably, the degasification units 48a and 48b can include, but are not limited to, air traps having openings that function as vents.

In the present embodiment, the first cell stack 100a and the second cell stack 100b constituting the pair of cell stacks can be connected to each other in series, while, in another embodiment, they can be connected in parallel.

Figure 2A:
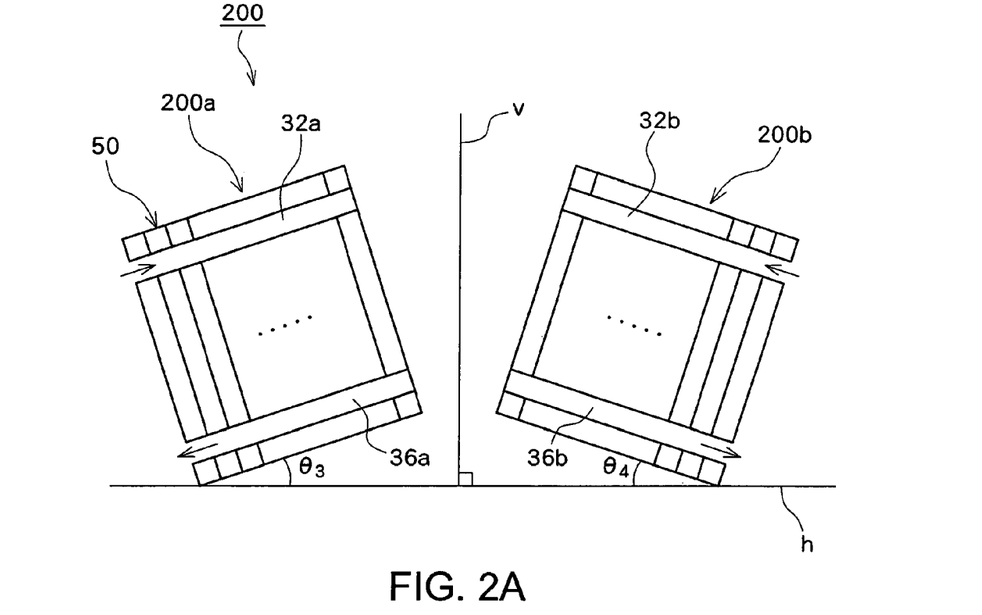
FIG. 2A is a schematic diagram of a fuel cell system configuration according to another embodiment of the present invention.
Figure 2B:
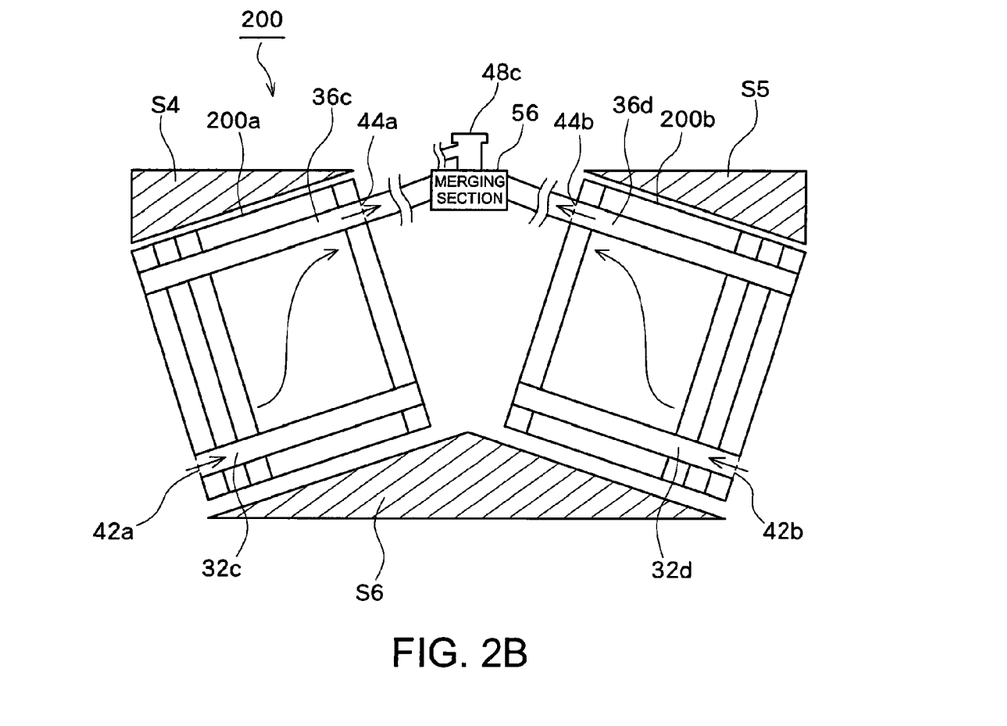
FIG. 2B is another schematic diagram of a fuel cell system configuration according to another embodiment of the present invention.

FIG. 2A and FIG. 2B are schematic diagrams illustrating an example of a configuration of a fuel cell system according to another embodiment of the present invention, and FIG. 2A particularly focuses on the flow of the reactant gases.

A fuel cell system 200 shown in FIG. 2A has almost the same configuration as the fuel cell system 100 shown in FIG. 1A, except that a first cell stack 200a and a second cell stack 200b constituting a pair of cell stacks are positioned symmetrically to each other with respect to a plane v perpendicular to a horizontal plane h, at an inclination in a general Λ shape when viewed from the side along the stacking direction of the unit cells 50.

In the first cell stack 200a and the second cell 200b shown in FIG. 2A, the reactant gases supplied into the cell stacks from the reactant gas supply manifolds 32a and 32b is used for electrode reaction in the unit cells 50, and then discharged, as off-gas, to the outside of the cell stacks from the reactant gas discharge manifolds 36a and 36b, respectively. Here, by positioning the first cell stack 200a and the second cell stack 200b so as to be inclined rearward at $\theta_3$ and $\theta_4$ with respect to the horizontal plane h, respectively (that is, by moving the upper end portions of the facing pair of the cell stacks away from each other, compared to the lower end portions), the reactant gas supply manifolds 32a and 32b and the reactant gas discharge manifolds 36a and 36b penetrating through each of the unit cells 50 are also inclined with respect to the horizontal plane h at approximately $\theta_3$ and $\theta_4$. Further, by setting $\theta_3=\theta_4$ and positioning the pair of cell stacks symmetrically with respect to the plane v perpendicular to the horizontal plane h, it is possible to control operation of each of the cell stacks in almost the same manner.

According to the present embodiment, provision of the inclined reactant gas manifolds is preferable, because they enable the moisture, which may be condensed in the reactant gas manifolds, to be quickly discharged to the outside, regardless of the operation status of the cell stacks.

In the present embodiment, the flow routes of the reactant gases are not limited to the routes shown in FIG. 2A, and can be other configurations that prevent accumulation of the condensed water inside the manifolds. From the viewpoints of efficiency and miniaturization, it is preferable to adopt a configuration in which the reactant gas flow paths, which communicate with each of the reactant gas manifolds to supply the reactant gases or discharge the off-gas, are at least partially merged and shared.

FIG. 2B is a diagram particularly focusing on the flow of the refrigerant in the fuel cell system shown in FIG. 2A. The fuel cell stack 200 shown in FIG. 2B has the refrigerant supply manifolds 32c and 32d having the refrigerant inlets 42a and 42b in the lower end side portions of the cell stacks, respectively, and the refrigerant discharge manifolds 36c and 36d having the refrigerant outlets 44a and 44b in the upper end side portions of the cell stacks, respectively, and the refrigerant is caused to flow.

In the present embodiment, the refrigerant supplied to each of the cell stacks is used for heat exchange with the unit cells 50 constituting the first cell stack 200a and the second cell stack 200b, and then discharged from the refrigerant discharge manifolds 36c and 36d, respectively. According to the present embodiment, the refrigerant supplied from the lower end side portions of the cell stacks flows toward the upper end side of the cell stacks while filling the refrigerant flow paths, thereby improving the cooling efficiency of the unit cells 50.

In FIG. 2B, when a refrigerant flow circulation system is adopted, it is possible to adopt a configuration in which the used refrigerant discharged to the outside of the cell stacks from the refrigerant outlets 44a and 44b is merged in a merging section 56 and then recycled by, for example, heat exchange or impurity removal, to thereby be reused as the refrigerant. Here, it is preferable to remove gas entrained in the refrigerant, such as air in the environment, by providing a degasification unit 48c in the refrigerant flow path, preferably, in a portion near the refrigerant outlets 44a and 44b where the flows of the refrigerant shift to the declining side; that is, a portion near the merging section 56 in FIG. 2B. According to the present embodiment, the degasification unit is preferable, because it maintains the cooling efficiency of the circulated refrigerant and prevents deterioration of the refrigerant when, for example, ethylene glycol is adopted as the refrigerant. Preferably, the degasification unit 48c can include, but is not limited to, the same configuration as the degasification unit 48a or 48b shown in FIG. 1B.

Although, in FIG. 1A, it is difficult to generally define preferable angle $\theta_1$ ($\theta_2$) because it depends on various conditions such as the body size of the fuel cell stack; particularly, the length in the stacking direction, the sizes of the reactant gas manifolds, and the wettability of the inner surfaces of the reactant gas manifolds (the degree of the hidrophilicity/the water repellency), it is possible to set an angle $\theta_1$ ($\theta_2$) to be, for example, approximately 5 degrees to 60 degrees, and more specifically, approximately 10 degrees to 45 degrees.

Meanwhile, although, in FIG. 2A, it is difficult to generally define a preferable angle $\theta_3$ ($\theta_4$) because it depends on various conditions such as the body size of the fuel cell stack; particularly, the length in the stacking direction, the sizes of the reactant gas manifolds, and the wettability of the inner surfaces of the reactant gas manifolds (the degree of the hydrophilicity/the water repellency), it is possible to set an angle $\theta_3$ ($\theta_4$) to be, for example, approximately 5 degrees to 60 degrees, and more specifically, approximately 10 degrees to 45 degrees.

In order to fix the pair of cell stacks in a predetermined position in the present embodiment, like in a stationary fuel cell, the pair of cell stacks can be installed so as to maintain a predetermined inclination between each of the pair of cell stacks and the horizontal plane h shown in FIG. 1A and FIG. 2A over a spacer or a stand. Meanwhile, in a case of a system in which the pair of cell stacks is mounted on a moving body such as a vehicle, the cell stacks mounted on the moving body are maintained horizontally, and, in this case, it is possible to desirably preset an inclination of an angle of the pair of cell stacks with respect to the horizontal plane according to the status of a route along which the moving body moves. Further, it is also preferable to adopt, in another embodiment, a configuration in which the pair of cell stacks are maintained at a certain angle with respect to the horizontal plane regardless of a posture (inclination) of the moving body on which the pair of cell stacks are mounted.

Thus, a dead space in which other components including a chassis cannot be installed may be present near the cell stacks; more specifically, above and below the pair of cell stacks (for example, spaces S1, S2, and S3 shown in FIG. 1B and spaces S4, S5, and S6 shown in FIG. 2B) depending on the angle of the inclination of the cell stacks with respect to the horizontal plane. Here, it is also preferable to provide in these tiny spaces a fluid flow pipe and/or an electrical wire through which the reactant gases and the refrigerant flow, where appropriate. According to the present embodiment, it is possible to utilize the tiny spaces effectively, thereby obtaining an advantage for miniaturization of the entire fuel cell system.

As described above, according to the present embodiments or the variants, it is possible to discharge the moisture in the reactant gas manifolds to the outside easily and quickly, and improve the cooling efficiency of the unit cells using the refrigerant.

Although the present invention can be used in any fuel cell system, it is particularly useful in a fuel cell system having cell stacks in which reactant gases containing moisture are supplied through reactant gas supply manifolds and off-gases of the reactant gases containing the moisture are discharged through reactant gas discharge manifolds.

The invention claimed is:

1. A fuel cell system mounted on a moving body, the fuel cell comprising:
   a cell stack formed by stacking a plurality of unit cells, each having a fuel electrode and an oxidizing electrode;
   a refrigerant inlet provided in a lower end side portion of the cell stack, for introducing a refrigerant to be used for heat exchange with the unit cells into the inside of the cell stack;
   a refrigerant outlet provided in an upper end portion of the cell stack, for discharging the refrigerant used for heat exchange with the unit cells to the outside of the cell stack; and
   a reactant gas manifold penetrating along a unit cell stacking direction, for supplying and discharging a reactant gas used for cell reaction in the fuel electrode and the oxidizing electrode, wherein:
   a pair of cell stacks are positioned symmetrically to each other with respect to a plane perpendicular to a horizontal plane; and
   the pair of cell stacks are positioned so as to be inclined with respect to the horizontal plane when viewed from a direction perpendicular to the unit cell stacking direction such that a plane defined by a unit cell stacking direction of one cell stack in the pair of cell stacks is inclined with respect to a plane defined by a unit cell stacking direction of the other cell stack in the pair of cell stacks, and the unit cell stacking directions of the cell stacks are in a V shape or a Λ shape when viewed from the direction perpendicular to the unit cell stacking direction.

2. The fuel cell system according to claim 1, wherein at least one of a fluid flow pipe and an electrical wire is provided near the cell stack.

3. The fuel cell system according to claim 1, wherein a degasification unit for removing air from the refrigerant discharged to the outside of the cell stack is provided near the refrigerant outlet.

4. The fuel cell system according to claim 2, wherein a degasification unit for removing air from the refrigerant discharged to the outside of the cell stack is provided near the refrigerant outlet.

5. The fuel cell system according to claim 1, wherein the pair of cell stacks arc positioned so as to be inclined forward 5 degrees to 60 degrees with respect to the horizontal plane so that upper end portions of the facing cell stacks arc closer to each other, as compared with lower end portions.

6. The fuel cell system according to claim 1, wherein the pair of cell stacks arc positioned so as to be inclined rearward 5 degrees to 60 degrees with respect to the horizontal plane so that upper end portions of the facing cell stacks arc further away from each other, as compared with lower end portions.

7. The fuel cell system according to claim 1, wherein the moving body is a vehicle.

\* \* \* \* \*

UNITED STATES PATENT AND TRADEMARK OFFICE
CERTIFICATE OF CORRECTION

| | | |
|---|---|---|
| PATENT NO. | : 8,647,786 B2 | Page 1 of 1 |
| APPLICATION NO. | : 12/810687 | |
| DATED | : February 11, 2014 | |
| INVENTOR(S) | : Yamagishi | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 554 days.

Signed and Sealed this
Twenty-fifth Day of August, 2015

Michelle K. Lee
*Director of the United States Patent and Trademark Office*